United States Patent
Ramesh et al.

(10) Patent No.: US 6,323,245 B1
(45) Date of Patent: Nov. 27, 2001

(54) BLOWING AGENT, POLYOLEFIN FOAM, AND PROCESS FOR PRODUCING POLYOLEFIN FOAM

(75) Inventors: N. S. Ramesh, Danbury, CT (US); S. T. Lee, Oakland, NJ (US); Lloyd George, Barnstable, MA (US)

(73) Assignee: Sealed Air Corporation (US), Saddlebrook, NJ (US)

( * ) Notice: Subject to any disclaimer, the term of this patent is extended or adjusted under 35 U.S.C. 154(b) by 0 days.

(21) Appl. No.: 09/645,719

(22) Filed: Aug. 24, 2000

(51) Int. Cl.⁷ ............... C08J 9/14; B01F 17/00
(52) U.S. Cl. ............... 516/10; 521/79; 521/98; 521/142; 521/143
(58) Field of Search ............... 521/98, 142, 143, 521/79; 516/10

(56) References Cited

U.S. PATENT DOCUMENTS

| | | | |
|---|---|---|---|
| 3,808,300 | 4/1974 | Miyamoto et al. | 264/53 |
| 4,101,467 | 7/1978 | Park et al. | 521/79 |
| 4,214,054 | 7/1980 | Watanabe et al. | 521/95 |
| 4,640,933 | 2/1987 | Park | 521/94 |
| 4,663,361 | 5/1987 | Park | 521/94 |
| 4,694,027 | 9/1987 | Park | 521/94 |
| 4,791,143 | 12/1988 | Tanaka et al. | 521/89 |
| 4,954,289 | 9/1990 | Bartlett et al. | 252/305 |
| 5,190,986 | 3/1993 | Allen et al. | 521/139 |
| 5,225,451 | 7/1993 | Rogers et al. | 521/94 |
| 5,240,657 | 8/1993 | Harclerode et al. | 264/53 |
| 5,278,196 | 1/1994 | Robin et al. | 521/98 |
| 5,290,822 | 3/1994 | Rogers et al. | 521/94 |
| 5,314,926 | 5/1994 | Robin et al. | 521/98 |
| 5,348,984 | 9/1994 | Lee | 521/79 |
| 5,399,592 | 3/1995 | Park | 521/79 |
| 5,405,883 | 4/1995 | Park | 521/98 |
| 5,462,974 | 10/1995 | Lee | 521/79 |
| 5,562,857 | 10/1996 | Werner et al. | 252/67 |
| 5,601,753 | 2/1997 | Omure et al. | 252/350 |
| 5,667,728 | 9/1997 | Lee | 252/350 |
| 5,801,208 | 9/1998 | Lee | 521/98 |

*Primary Examiner*—Morton Foelak
(74) *Attorney, Agent, or Firm*—Thomas C. Lagaly

(57) ABSTRACT

A blowing agent for expanding an extrudable, expandable polyolefin foam product, the blowing agent including a blend of isobutane and n-butane. The isobutane is present in the blend at a weight percentage ranging from 35 to 65 and the n-butane is present in the blend at a weight percentage ranging from 35 to 65.

21 Claims, 1 Drawing Sheet

BLOWING AGENT, POLYOLEFIN FOAM, AND PROCESS FOR PRODUCING POLYOLEFIN FOAM

BACKGROUND OF THE INVENTION

The present invention relates generally to polyolefin foams and, more particularly, to an improved blowing agent for producing such foams.

Polyolefin foams are commonly made by an extrusion process that is well known in the art. In such a process, polyolefin resin is added to an extruder, typically in the form of pellets. Common polyolefins employed in such a process include polyethylenes, such as low density polyethylene (LDPE), and polypropylene. In the extruder, the resin pellets are melted and mixed, and a blowing agent is admixed with the melted polyolefin. The blowing agent must be at least partially miscible in the polymer at the temperature and pressure conditions within the extruder such that at least a portion of the blowing agent dissolves into the molten polymer. The extruder pushes the melt mixture (melted polyolefin and blowing agent) through a die at the end of the extruder and into a region of reduced temperature and pressure (relative to the temperature and pressure within the extruder). Typically, the region of reduced temperature and pressure is the ambient atmosphere. The sudden reduction in pressure causes that portion of the blowing agent that is dissolved in the polymer to come out of solution, nucleate, and vaporize/expand into a plurality of cells within the polymer that solidify upon cooling of the polymer mass (due to the reduction in temperature), thereby trapping the blowing agent within the cells.

Following the extrusion and cooling of the foam, a concentration gradient is established between the cells of the foam and the ambient atmosphere, such that the blowing agent will have a tendency to diffuse out of the foam cells while air will have a tendency to diffuse into the cells. A problem frequently encountered with certain blowing agents is that, during this aging or curing period, the blowing agent diffuses out of the foam cells more rapidly than air diffuses into the cells, resulting in the partial or complete collapse of the cell walls and consequent reduction in the volume of the foam. This reduction in volume is highly undesirable, in that it adversely impacts the cushioning performance of the foam. The ability of a foam to resist such loss in volume is generally referred to as the "dimensional stability" of the foam.

In the past, chlorofluorcarbons, such as 1,2-dichlorotetrafluoroethane, dichlorodifluoromethane, trichloromonofluoromethane, etc., were used as blowing agents in the production of polyolefin foams because, among other reasons, the rate of diffusion of such materials out of the foam was slow enough to approximate the rate of diffusion of air into the foam to prevent significant cell wall collapse. Relative to other potential blowing agents, however, chlorofluorcarbons are expensive and believed to be harmful to the environment. The continued use of such materials as blowing agents, therefore, is highly undesirable.

Accordingly, efforts have been made to use less expensive and more environmentally-friendly blowing agents that also provide good dimensional stability to polyolefin foams. For example, U.S. Pat. Nos. 4,694,027, 4,640,933, and 4,663,361 disclose, as a complete or partial replacement for chlorofluorcarbon blowing agents, a mixture of at least 70% isobutane with a physical blowing agent selected from the group consisting of hydrocarbons, chlorocarbons, and chlorofluorocarbons having from 1 to 5 carbon atoms, boiling points between −50° C. and 50° C., and a permeation rate through an olefin polymer resin modified with a stability control agent of greater than about 1.2 times the permeation rate of air.

While such blowing agents composed primarily of isobutane have proven to be adequate replacements for chlorofluorcarbons in many respects, a number of drawbacks have been identified. First, the permeation rate of isobutane through polyolefins is higher than would ideally be desired, resulting in lower-than-desired dimensional stability in polyolefin foams made from blowing agents having a high isobutane content (i.e., greater than about 65%). In addition, the solubility of isobutane in polyolefins, particularly in polyethylenes such as LDPE, is low in comparison to other available blowing agents such that it is difficult to produce lower density polyethylene foams, i.e., 1.5 pounds/ft$^3$ or less, at foam 'plank' thicknesses of about 1.5 inches or more when the blowing agent used has a high isobutane content because less dissolved blowing agent is available for vaporization and expansion into cells within the polymer. Also for this reason, very low foam densities of 1 pound/ft$^3$ or less are difficult to attain with blowing agents having a high isobutane content at any foam thickness, e.g., even at foam 'sheet' thicknesses of 1 inch or less.

A further drawback of high-isobutane-content blowing agents is that isobutane has a relatively high degree of volatility, which makes it difficult to produce foam planks having a thickness of greater than about 1.5 inches, regardless of the foam density. This is because a larger die opening is required to produce a thicker foam. A larger die opening, however, generally results in less pressure within the die, which can lead to premature vaporization of the blowing agent, and therefore cell formation, inside the die when higher volatility gases such as isobutane are employed as major components of the blowing agent. Such premature foaming is undesirable because it produces cell coalescence and other irregularities in cell structure, both of which deleteriously affect the quality and cushioning properties of the foam.

Accordingly, a need still exists in the art for an improved alternative to chlorofluorcarbon blowing agent for use in the production of polyolefin foams.

SUMMARY OF THE INVENTION

That need is met by the present invention, which provides a blowing agent for expanding an extrudable, expandable polyolefin foam product, the blowing agent comprising a blend of isobutane and n-butane, the isobutane being present in the blend at a weight percentage ranging from 35 to 65 and the n-butane being present in the blend at a weight percentage ranging from 35 to 65, the weight percentages being based on the total weight of the isobutane and n-butane in the blowing agent.

Another aspect of the invention is a process for producing an extruded polyolefin foam product, comprising:

a. mixing a blowing agent with a molten polyolefin to form a foamable mixture, the blowing agent comprising a blend of isobutane and n-butane, the isobutane being present in the blend at a weight percentage ranging from 35 to 65 and the n-butane being present in the blend at a weight percentage ranging from 35 to 65, the weight percentages being based on the total weight of the isobutane and n-butane in the blowing agent; and b. extruding the foamable mixture so that the blowing agent expands within the mixture to produce a foam.

A further aspect of the invention is a foam, comprising:
a. a polyolefin; and
b. prior to any diffusion, a blowing agent comprising a blend of isobutane and n-butane, the isobutane being present in the blend at a weight percentage ranging from 35 to 65 and the n-butane being present in the blend at a weight percentage ranging from 35 to 65, the weight percentages being based on the total weight of the isobutane and n-butane in the blowing agent.

DETAILED DESCRIPTION OF THE INVENTION

Figure 1:
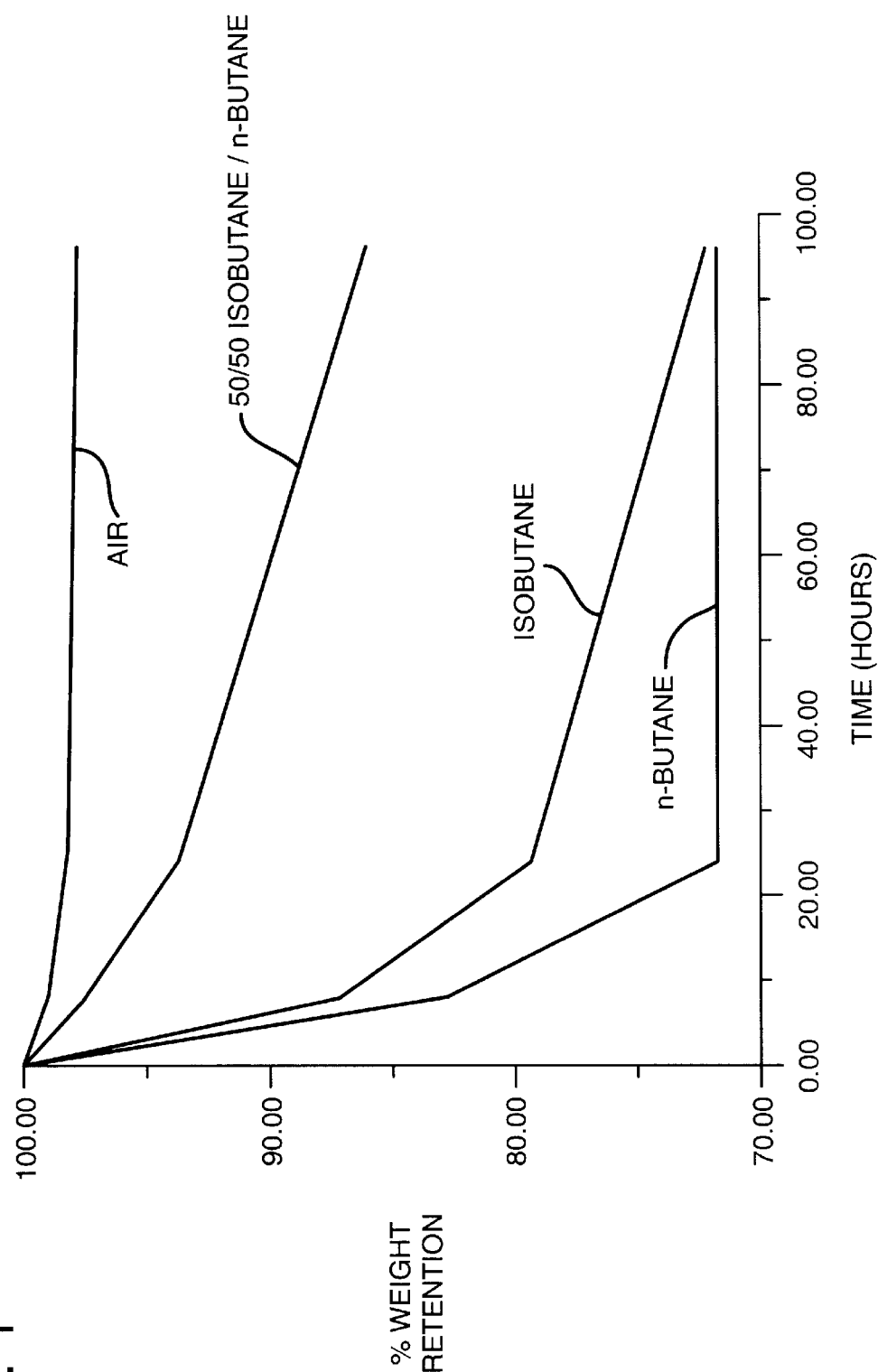
FIG. 1 is a graph showing % weight retention of blowing agent in LDPE vs. time for a number of different gases, as explained in Example 1.

A blowing agent in accordance with the present invention comprises a blend of isobutane and n-butane. The isobutane is present in the blend at a weight percentage ranging from 35 to 65 and the n-butane is present in the blend at a weight percentage ranging from 35 to 65, such weight percentages being based on the total weight of the isobutane and n-butane in the blowing agent. As demonstrated in the Examples below, such blowing agent blend has been shown unexpectedly to produce polyolefin foams having greater dimensional stability than foams made with either pure isobutane or blends of isobutane and n-butane in which the isobutane was present in amounts greater than 65 wt. %. In addition, foams made with a blowing agent blend in accordance with the invention exhibited higher compression strength relative to foam made with a blowing agent having greater than 65 wt. % isobutane.

A blowing agent blend in accordance with the present invention is also beneficial relative to high-isobutane-content blowing agents in that n-butane is more soluble in polyethylene than is isobutane. Thus, lower density foams (less than about 1.5 pounds/ft$^3$) are more readily made with the present blend than with higher-isobutane-content blowing agents since more of the blowing agent is available in the polymer for producing foam cells. This is particularly beneficial in producing such lower density foams in relatively thick planks with thicknesses of 1.5 inches or more, or in producing very low density foams of 1 pound/ft$^3$ or less.

A further benefit of the blowing agent blend in accordance with the invention is that it allows foam planks of a thickness greater than about 1.5 inches to be produced with less likelihood of cell coalescence and other irregularities in cell structure, which can otherwise result when prefoaming occurs inside the die. As noted above, thicker foams (planks) are produced by employing a relatively wide die opening in the thickness dimension of the foam (in comparison to a narrower die opening as used to make thinner foam sheets). Wider die openings, however, result in reduced pressure inside the die. When the die pressure is lower than the vapor pressure of the blowing agent at the foaming temperature, the blowing agent vaporizes from the polymer and begins to produce cells, i.e., foam, inside the die. As an example, in the production of polyethylene foam, typical foaming temperatures range from about 225 to 235° F. Isobutane has a vapor pressure of 335.7 psig at 230° F. while n-butane has a vapor pressure of 256.2 psig at 230° F. When the two alkanes are blended together in equal amounts, the vapor pressure of the resultant blend at 230° F. is about 296 psig (calculated based on the mixing rule of binary systems). Thus, a 50/50 wt. % blend of isobutane/n-butane exhibits 11.8% lower vapor pressure ((335.7−296)/335.7)*100) than pure isobutane. This allows the die to be opened about 10% more in the thickness direction to make thicker products without prefoaming inside the die.

The inventors have also determined that the blowing agent blend should have no more than 65 wt. % n-butane, i.e., at least 35 wt. % isobutane. Due to the relatively high degree of solubility of n-butane in polyethylene, if n-butane is present in amounts exceeding 65 wt. %, it can readily condense in the foam cells, particularly under low temperature conditions, e.g., at temperatures of 35° F. or less as often experienced in warehouses and trucks during the winter months. The condensation of the blowing agent results in the partial or complete collapse of the foam, depending on the density of the foam (with lower density foams collapsing to a greater extent than higher density foams). The tendency for n-butane to condense in the foam cells has been found to be much less consequential when at least 35 wt. % isobutane is included in the blowing agent blend.

As noted above, the blowing agent blend of the present invention comprises between 35 and 65 wt. % isobutane and between 35 and 65 wt. % n-butane. Within such weight percentage ranges, all sub-ranges are included within the scope of the invention. For example, the isobutane weight percentage may range from 36 to 64, 37 to 63, 40 to 60, 42 to 58, 45 to 55, 46 to 54, 47 to 53, etc. Similarly, the weight percentage of n-butane in the blend may range from 36 to 64, 37 to 63, 40 to 60, 42 to 58, 45 to 55, 46 to 54, 47 to 53, etc.

As used herein, the term "isobutane," also known as 2-methylpropane or trimethylmethane, is represented by the formula $(CH_3)_2CHCH_3$, and has a boiling point of approximately −12° C. As used herein, "n-butane," also known as "normal-butane" or simply "butane," is represented by the formula $CH_3CH_2CH_2CH_3$, and has a boiling point of approximately −0.5° C.

If desired, the blowing agent blend may consist essentially of isobutane and n-butane. Alternatively, the blowing agent blend may further include additional chemical or physical blowing agent materials, such as, e.g., carbon dioxide, ethane, propane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polyolefin in any desired amount to achieve a desired degree of expansion in the resultant foam. Generally, the blowing agent may be added to the polyolefin in an amount ranging from about 0.5 to 80 parts by weight, based on 100 parts by weight of the polyolefin. More preferably, the blowing agent is present at an amount ranging from 1 to 30 and, most preferably, from 3 to 15 parts per 100 parts by weight of the polyolefin.

The blowing agent blend in accordance with the present invention may be used in a variety of processes to produce any desired foam. In one such process, an extruded polyolefin foam product is produced by mixing the above-described blowing agent blend in accordance with the invention with a molten polyolefin to form a foamable mixture. The foamable mixture is then extruded so that the blowing agent expands within the mixture to produce a foam.

Extrusion processes for making polyolefin foams are well known in the art. In such processes, the polyolefin is added to an extruder, preferably in the form of resin pellets. Any conventional type of extruder may be used, e.g., single screw, double screw, and/or tandem extruders. In the extruder, the resin pellets are melted and mixed. A blowing agent blend in accordance with the present invention is preferably added to the melted polyolefin via one or more injection ports in the extruder. Any additives that are used (see below) may be added to the melted polyolefin in the extruder and/or may be added with the resin pellets. The extruder pushes the entire melt mixture (melted polyolefin, blowing agent, and any additives) through a die at the end of the extruder and into a region of reduced temperature and pressure. As noted above, the sudden reduction in pressure causes the blowing agent to nucleate and expand into a plurality of cells that solidify upon cooling of the polymer mass (due to the reduction in temperature), thereby trapping the blowing agent within the cells. An extruded polyolefin foam is thereby formed.

A foam in accordance with the present invention, whether formed by extrusion or otherwise, comprises a polyolefin as the polymeric matrix of the foam. In addition, within the cells of the foam is contained the above-described blowing agent blend in accordance with the invention. Such blowing agent blend is present in the foam cells at least initially after the foam is formed, i.e., prior to any diffusion of the blowing agent from the foam. This will generally occur at some point after the foam is produced if placed in air, wherein air will gradually replace the blowing agent blend in the foam cells. An advantage of the invention is that the rate of diffusion of the blowing agent blend out of the cells is sufficiently close to the rate of air ingress into the cells that foam shrinkage is minimized or eliminated, i.e., the present blowing agent produces foams that have a high degree of dimensional stability.

Polyolefins that may be used in accordance with the present invention include polyethylene homopolymer or copolymer or polypropylene homopolymer or copolymer. Examples of useful polyethylene homopolymers include low density polyethylene and high density polyethylene. Polyethylene copolymers may include, e.g., homogeneous ethylene/alpha-olefin copolymers (i.e., metallocene/single-site catalyzed copolymers of ethylene and, e.g., one or more $C_3$ to $C_{10}$ alpha-olefin comonomers) or heterogeneous (i.e., Ziegler-Natta catalyzed) ethylene/alpha-olefin copolymers. A preferred polyethylene is low density polyethylene (LDPE) having a melt flow index ranging from about 1 to about 40 and a density ranging from about 0.915 to about 0.930 g/cc.

Various polypropylenes are suitable in accordance with the practice of the present invention, including atactic, isotactic, syndiotactic, long-chain branced, and propylene/ethylene copolymers. Preferred polypropylenes have a melt flow index ranging from about 1 to 20 and a density ranging from about 0.87 to 0.915 g/cc.

Foam in accordance with the invention may be in the form of a foam sheet or plank having a thickness ranging from about 0.25 to about 4 inches, with sheets generally having a thickness of less than 1.5 inches and planks having a thickness of 1.5 or more inches. The foam may have any desired density, ranging, e.g., from about 1 to about 30 pounds/ft$^3$. The density preferably ranges from about 1 to about 10 pounds/ft$^3$ and, more preferably, from about 2 to about 8 pounds/ft$^3$. The foam preferably has at least about 70% closed cells, more preferably about 80% closed cells and, most preferably, at least about 90% closed cells.

If desired or necessary, various additives may be included with the polyolefin. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

These and other aspects and advantages of the invention may be further understood by reference to the following examples, which are provided for illustrative purposes only and are not intended in any way to be limiting.

EXAMPLE 1

This example shows the permeation rate through a single bubble made from LDPE of isobutane, normal butane, and a blend of isobutane and n-butane relative to air. The reason for using a single bubble for the permeation study is to approximate actual polyethylene foams that consist of many such individual bubbles (generally referred to as cells).

The procedure to make the bubbles was as follows. A 2 mil thick tube comprising LDPE (2 MI, 0.919 g/cc) and 2% Kemamide S-180 aging modifier (stearyl stearamide, supplied by Humko Chemical Division of Witco Chemical) was extruded with a single screw extruder and blown via the standard blown film process as well known in the art. The layflat width of the uninflated tube was 9 inches. The tube was cut into sections of about 8 inches in length, and both ends of each section were heat-sealed with an impulse type sealer having ¼ inch wide heating element. Several pouches were thereby formed, and each pouch was made into a bubble by filling the pouch with one of the above blowing agents or air. This was achieved by cutting a corner into each bubble, inserting a needle valve through the resultant opening, and injecting the desired blowing agent or air into the bubble via the needle valve. The gas was supplied until the bubble was firm but not overly stretched. The corner that had the needle valve was placed on the heat seal bar. When the desired firmness was achieved, the heat sealer was activated and, just before contact, the needle valve was carefully removed, thereby sealing inside the bubbles one of the above blowing agents or air.

Four bubbles were thus formed. One bubble contained air, another bubble contained 100% isobutane, a third bubble contained 100% n-butane, and a fourth bubble contained a blend of 50 wt. % isobutane and 50 wt. % n-butane. In order to measure the permeation rate of each blowing agent vs. air through the LDPE bubble, each bubble was placed on a balance to monitor its weight loss with time. Immediately after being formed, each bubble was weighed. At predetermined intervals after the start of the test, the bubbles were repeatedly weighed and recorded, and this weight was compared with the weight of such bubble at the start of the test. The "% Weight Retention" for each bubble as reported in Table 1 below was determined by dividing the weight of each bubble at the indicated time by the initial weight of the bubble and multiplying the result by 100, i.e., (weight at indicated time/initial weight)×100. The % weight retention value provides a measure of the permeability of the blowing agent through the LDPE bubble, with the % weight retention of the gas being inversely proportional to the permeation of such blowing agent through the bubble. Thus, the higher the % weight retention value for a blowing agent, the greater is the foam stability for a PE foam made from such blowing agent.

The results are summarized in Table 1, where "Air" represents the % weight retention for the bubble filled with air, "Isobutane" represents the % weight retention for the bubble filled with isobutane, etc.

TABLE 1

| | % Weight Retention | | | |
|---|---|---|---|---|
| Time, hours | Air | Isobutane | n-Butane | 50/50 blend (by weight) Isobutane/ n-Butane |
| 0 (start) | 100 | 100.00 | 100.00 | 100.00 |
| 0.5 | 99.00 | 99.59 | 98.38 | 99.79 |
| 1 | 99.18 | 97.13 | 96.97 | 99.54 |
| 1.5 | 99.22 | 96.13 | 95.53 | 99.42 |
| 2 | 99.55 | 95.11 | 94.12 | 99.33 |
| 2.5 | 99.37 | 93.86 | 94.03 | 99.14 |
| 3 | 99.22 | 93.31 | 92.83 | 99.04 |
| 3.5 | 99.20 | 92.63 | 91.72 | 98.94 |
| 4 | 98.94 | 91.82 | 91.00 | 98.46 |
| 4.5 | 98.96 | 91.03 | 87.67 | 98.29 |
| 6 | 98.83 | 88.99 | 85.47 | 98.17 |
| 8 | 98.98 | 86.99 | 82.69 | 97.45 |
| 24 | 98.26 | 79.29 | 71.81 | 93.69 |
| 96 | 97.73 | 72.05 | 71.64 | 86.01 |

For each bubble, % weight retention readings are reported for the start of the experiment, through the first 8 hrs after the start, at 24 hours after the start, and at 96 hours after the start. As would be expected, the bubble containing air exhibited the highest percentage of weight retention. N-butane showed the least weight retention, i.e., highest rate of permeation through the LDPE bubble. Isobutane permeated through the LDPE more slowly when compared to n-butane. But surprisingly, the 50/50 blend of isobutane/n-butane exhibited a synergistic effect in that such blend permeated through the LDPE more slowly than either of the pure (unblended) blowing agents. That is, instead of resulting in a permeation rate (% weight retention) that was between the permeation rates of isobutane and n-butane as might be expected, the 50/50 blend of isobutane and n-butane unexpectedly resulted in a permeation rate that was lower than either of the components of such blend. These results as set forth in Table 1 are illustrated graphically in FIG. 1. The unexpected synergy exhibited by the 50/50 blend of isobutane an n-butane is highly favorable in that it provides for a greater degree of dimensional stability in foams made from such blowing agent blend in accordance with the present invention vs. foams made from either blowing agent alone.

EXAMPLE 2

Foam sheets having a density of 1.2 pounds/ft$^3$ (pcf) and a thickness of 0.5 inches were made by extrusion from LDPE and either 100% isobutane or a blend of 50/50 wt. % isobutane/n-butane, and tested for their ability to maintain dimensional stability over time, i.e., the ability to resist changes in size and shape as the foam ages. The foam sheets comprised LDPE (2 MI, 0.919 g/cc), talc, and glycerol monostearate (GMS), with either 100% isobutane or a 50/50 wt. % blend of isobutane/n-butane. Four sheets of each foam were heat laminated together to form a foam laminate having a thickness of 2 inches. The resultant laminates were then subjected to the Die-Cut Shrinkage Test as follows:
Experimental Procedure for Die Cut Shrinkage Test A die having two concentric rectangular-shaped blades was used to shape and sever an open, rectangular-shaped section from the LDPE foam laminates. The inner rectangular blade was 20.062 inches long and 4 inches wide. The outer rectangular blade was 22 inches long and 6 inches wide. The depth of each blade was ½". The blades were mounted on a wooden board coated with Teflon.

The steps involved in die cutting process were as follows:
1. The die was placed on top of the foam laminate (on the same day the foams comprising the laminate were produced) with the blades facing down towards and in contact with the upper surface of the foam. The longest (length) dimension of the rectangular-shaped die was aligned with (parallel to) the machine direction of the foam sheets, i.e., the direction in which the foam sheets were extruded.
2. The die was then forced against and into the foam by applying pressure using a hydraulic press. Once the blades had cut completely through the thickness of the foam laminate, the direction of the press was reversed, thereby pulling the cut, rectangular-shaped foam from the rest of the laminate. The rectangular-shaped foam, which had a rectangular-shaped central opening therein, was then separated from the die.
3. The length dimension of the rectangular-shaped central opening of the die-cut foam was determined by measuring the distance between the inner surfaces of the short sides of the rectangle ("Die-Cut Length Dimension").
4. The Die-Cut Length Dimension was repeatedly measured over a period of 36 days to record the changes in the length dimension of the rectangular-shaped foam.

The foregoing test was designed to match actual use conditions, as end-users of polyethylene foam typically employ dies similar to the above configuration for making desired cushion shapes from the foam.

Table 2 lists the data from the above-described Die-Cut Shrinkage Test for LDPE foams made from 100% isobutane vs. a blend of 50/50 wt. % isobutane/n-butane. "Days of Curing" represent the number of days that elapsed after the day that the foam was formed, laminated, and die cut.

TABLE 2

| Days of Curing | 100% Isobutane: Die-Cut Length Dimension (inches) | 50/50 Isobutane/n-Butane: Die-Cut Length Dimension (inches) |
|---|---|---|
| Original Die Cut Length | 20.062 | 20.062 |
| 0 | 19.9375 | 19.9375 |
| 1 | 19.875 | 19.875 |
| 5 | 19.8125 | 19.8125 |
| 6 | 19.8125 | 19.8125 |
| 7 | 19.8125 | 19.8125 |
| 8 | 19.8125 | 19.8125 |
| 12 | 19.75 | 19.8125 |
| 21 | 19.75 | 19.8125 |
| 23 | 19.75 | 19.8125 |
| 36 | 19.75 | 19.8125 |
| % Shrinkage | 1.56% | 1.25% |

The above data shows that the foam made with the 50/50 isobutane/n-butane blend stabilizes sooner (5 days of curing) than the foam made from 100% isobutane (12 days of curing). It also shinks less (1.25%) than the foam made using 100% isobutane (1.56%).

EXAMPLE 3

Foam planks having a thickness of 2.25 inches and a density of 2.2 pcf were made by extrusion from a blend of LDPE (2 MI, 0.919 g/cc density), talc, GMS aging modifier. Both 100% isobutane and 50/50 isobutane/n-butane were used as blowing agents to make the foam planks. The planks were subjected to the Die-Cut Shrinkage Test as described above; the results are summarized in Table 3:

TABLE 3

| Days of Curing | 100% Isobutane: Die-Cut Length Dimension (inches) | 50/50 Isobutane/n-Butane: Die-Cut Length Dimension (inches) |
| --- | --- | --- |
| Original Die Cut Length | 20.0625 | 20.0625 |
| 0 | 20.1250 | 20.0938 |
| 1 | 20.0833 | 20.0938 |
| 2 | 20.0833 | 20.0833 |
| 3 | 20.0313 | 20.0729 |
| 4 | 20.0313 | 20.0729 |
| 5 | 20.0313 | 20.0729 |
| 6 | 20.0313 | 20.0729 |
| 7 | 20.0313 | 20.0729 |
| 8 | 20.0313 | 20.0729 |
| 9 | 20.0313 | 20.0729 |
| 10 | 20.0313 | 20.0729 |
| 11 | 20.0313 | 20.0625 |
| 12 | 20.0313 | 20.0625 |
| 13 | 20.0313 | 20.0625 |
| 14 | 20.0104 | 20.0521 |
| 15 | 20.0313 | 20.0625 |
| 16 | 20.0313 | 20.0625 |
| 17 | 20.0313 | 20.0625 |
| 18 | 20.0313 | 20.0625 |
| 19 | 20.0313 | 20.0625 |
| % Shrinkage | 0.156% | 0% |

As with the lower density foams in Example 2, the higher density foams in this example exhibited an increase in dimensional stability when made from 50/50 isobutane/n-butane vs. foam made from 100% isobutane in that the former foam shrank less than the latter.

EXAMPLE 4

Foam planks were made as in Example 3 (same composition, thickness, ect.), except that the isobutane/n-butane blend was 60 wt. % isobutane and 40 wt. % n-butane. The planks were subjected to the Die-Cut Shrinkage Test as described above; the results are summarized in Table 4:

TABLE 4

| Days of Curing | 100% Isobutane: Die-Cut Length Dimension (inches) | 60/40 Isobutane/n-Butane: Die-Cut Length Dimension (inches) |
| --- | --- | --- |
| Original Die Cut Length | 20.0625 | 20.0625 |
| 0 | 20.167 | 20.125 |
| 1 | 20.115 | 20.094 |
| 2 | 20.094 | 20.073 |
| 4 | 20.083 | 20.052 |
| 5 | 0.063 | 20.052 |
| 6 | 20.052 | 20.031 |
| 7 | 20.052 | 20.031 |
| 11 | 20.052 | 20.031 |
| 14 | 20.031 | 20.021 |
| % Shrinkage | 0.16% | 0.2% |

In comparing the results of Examples 3 and 4, it can be seen that the dimensional stability of foams made with 60/40 isobutane/n-butane is less than foams made from 50/50 isobutane/n-butane, and is closer to the dimensional stability exhibited by foam made from 100% isobutane. Nevertheless, blending at least 35% n-butane with isobutane is preferred to 100% isobutane, or blends thereof with more than 65% isobutane, because n-butane is more soluble in LDPE and less volatile than isobutane. Thus, as noted above, producing lower density foams and/or thicker foams are much more readily attainable by blending at least 35% n-butane with isobutane.

EXAMPLE 5 (COMPARATIVE)

Foam planks were made as in Example 3, except that the isobutane/n-butane blend was 70 wt. % isobutane and 30 wt. % n-butane. The planks were subjected to the Die-Cut Shrinkage Test as described above; the results are summarized in Table 5:

TABLE 5

| Days of Curing | 100% Isobutane: Die-Cut Length Dimension (inches) | 70/30 Isobutane/n-Butane: Die-Cut Length Dimension (inches) |
| --- | --- | --- |
| Original Die Cut Length | 20.0625 | 20.0625 |
| 0 | 20.167 | 20.125 |
| 1 | 20.115 | 20.125 |
| 2 | 20.094 | 20.094 |
| 4 | 20.083 | 20.031 |
| 5 | 20.063 | 20.031 |
| 6 | 20.052 | 20.031 |
| 7 | 20.052 | 20.031 |
| 11 | 20.052 | 20.000 |
| 14 | 20.031 | 19.99 |
| % Shrinkage | 0.156% | 0.36% |

As indicated by comparing Examples 3, 4, and 5, when the amount of isobutane in the isobutane/n-butane blend reaches 70%, the dimensional stability of the foam produced by such 70/30 blend is markedly inferior to foam made with 100% isobutane. Accordingly, isobutane/n-butane blends having less than 70% isobutane, e.g., no more than about 65% isobutane, are preferred in that such blends produce more dimensionally stable foams than isobutane/n-butane blends having more than 65% isobutane.

EXAMPLE 6

Rectangular-shaped LDPE foam planks having a density of 2.2 pcf, a thickness of 2.25 inches, a length of 114 inches, and a width of 24 inches were made by extrusion from a blend of LDPE (2 MI, 0.919 g/cc density), talc (2%), and GMS aging modifier (1.5%). Both 100% isobutane and various isobutane/n-butane blends as shown in Table 6 below were used as blowing agents. The planks were subjected to a shrinkage test that was similar to the Die-Cut Shrinkage Test as described above, except that the planks were not die-cut, i.e., had no rectangular-shaped central opening, but were simply measured in the length dimension after a cure period of 14 days (i.e., 14 days after being made) in order to determine the extent to which such foams shrank in length over that period. The results are summarized in Table 6:

TABLE 6

| Blowing Agent | Initial Length (Hot Length after extrusion) (inches) | Cured Length after Aging for 14 days (inches) | Dimensional Change - % Shinkage from Initial Length |
| --- | --- | --- | --- |
| 100% Isobutane [comparative] | 114.0 | 110.0 | 3.5% |
| 50/50 Isobutane/n-Butane Blend | 114.0 | 111.875 | 2.125% |
| 60/40 Isobutane/n-Butane Blend | 114.0 | 110.75 | 2.85% |
| 70/30 Isobutane/n-butane Blend [comparative] | 114.0 | 111.125 | 2.52% |

As with the previous examples, this example demonstrates that blends of isobutane with n-butane are preferred to 100% isobutane for producing PE foams with greater dimensional stability, with optimum results occurring when the blend contains approximately equal amounts of both blowing agents.

EXAMPLE 7

The same foam laminates used in Example 2 were used in this example to test for compression strength, except that such laminates were not die cut. The 2" thick laminated foams were tested for compression strength in accordance with ASTM D-3575, Suffix D. The results are summarized below in Table 7:

TABLE 7

| Property | 100% Isobutane | 50/50 Isobutane/n-Butane Blend | % Increase in Performance |
|---|---|---|---|
| Compression Strength at 75% compression, psi | 6.2 | 6.6 | 6.45% |

As shown, the 50/50 isobutane/n-butane blend resulted in a foam having 6.45% more compression strength than that made from 100% isobutane.

While the invention has been described with reference to illustrative examples, those skilled in the art will understand that various modifications may be made to the invention as described without departing from the scope of the claims which follow.

What is claimed is:

1. A blowing agent for expanding an extrudable, expandable polyolefin foam product, said blowing agent comprising a blend of isobutane and n-butane, said isobutane being present in said blend at a weight percentage ranging from 40 to 60 and said n-butane being present in said blend at a weight percentage ranging from 40 to 60, said weight percentages being based on the total weight of said isobutane and n-butane in said blowing agent.

2. The blowing agent of claim 1, wherein said isobutane is present in said blend at a weight percentage ranging from 45 to 55 and said n-butane is present in said blend at a weight percentage ranging from 45 to 55.

3. The blowing agent of claim 1, wherein said blowing agent further includes propane.

4. The blowing agent of claim 1, wherein said blowing agent consists essentially of isobutane and n-butane.

5. A process for producing an extruded polyolefin foam product, comprising:

a. mixing a blowing agent with a molten polyolefin to form a foamable mixture, said blowing agent comprising a blend of isobutane and n-butane, said isobutane being present in said blend at a weight percentage ranging from 40 to 60 and said n-butane being present in said blend at a weight percentage ranging from 40 to 60, said weight percentages being based on the total weight of said isobutane and n-butane in said blowing agent; and b. extruding said foamable mixture so that said blowing agent expands within said mixture to produce a foam.

6. The process of claim 5, wherein said isobutane is present in said blend at a weight percentage ranging from 45 to 55 and said n-butane is present in said blend at a weight percentage ranging from 45 to 55.

7. The process of claim 5, wherein said blowing agent further includes propane.

8. The process of claim 5, wherein said blowing agent consists essentially of isobutane and n-butane.

9. The process of claim 5, wherein said polyolefin comprises at least one member selected from the group consisting of low density polyethylene, high density polyethylene, ethylene/alpha-olefin copolymer, and polypropylene.

10. The process of claim 9, wherein said polyolefin comprises low density polyethylene.

11. The process of claim 5, wherein said foam is a foam sheet or plank having a thickness ranging from about 0.25 to about 4 inches.

12. The process of claim 5, wherein said foam has a density ranging from about 1 to about 10 pounds/ft$^3$.

13. A foam made by the process of claim 5.

14. A foam comprising:

a. a polyolefin; and b. prior to any diffusion, a blowing agent comprising a blend of isobutane and n-butane, said isobutane being present in said blend at a weight percentage ranging from 40 to 60 and said n-butane being present in said blend at a weight percentage ranging from 40 to 60, said weight percentages being based on the total weight of said isobutane and n-butane in said blowing agent.

15. The foam of claim 14, wherein said isobutane is present in said blend at a weight percentage ranging from 45 to 55 and said n-butane is present in said blend at a weight percentage ranging from 45 to 55.

16. The foam of claim 14, wherein said blowing agent further includes propane.

17. The foam of claim 14, wherein said blowing agent consists essentially of isobutane and n-butane.

18. The foam of claim 14, wherein said polyolefin comprises at least one member selected from the group consisting of low density polyethylene, high density polyethylene, ethylene/alpha-olefin copolymer, and polypropylene.

19. The foam of claim 18, wherein said polyolefin comprises low density polyethylene.

20. The foam of claim 14, wherein said foam is a foam sheet or plank having a thickness ranging from about 0.25 to about 4 inches.

21. The foam of claim 14, wherein said foam has a density ranging from about 1 to about 10 pounds/ft$^3$.

* * * * *